UNITED STATES PATENT OFFICE 2,123,851

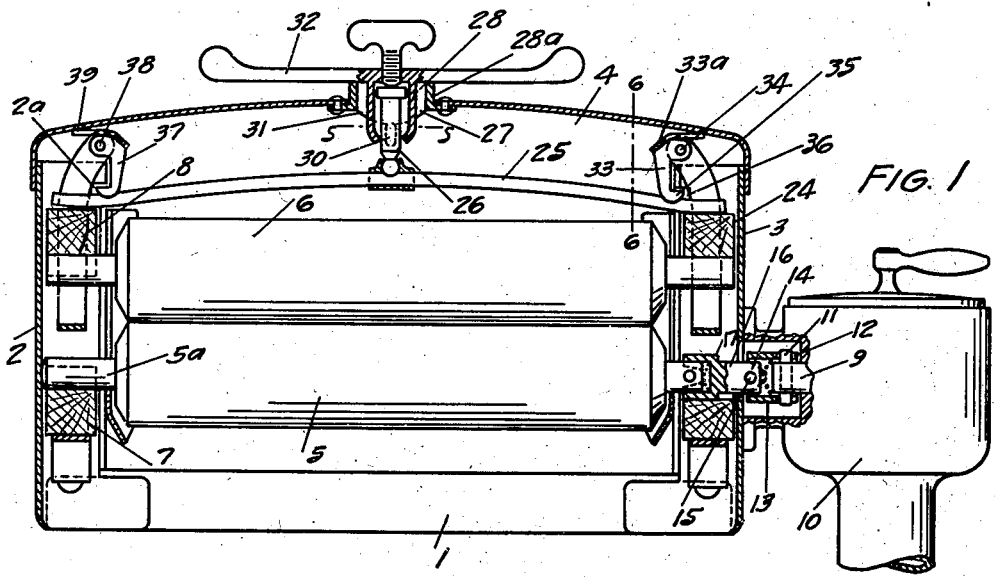

WRINGER

Walter L. Kauffman, II, Erie, Pa., assignor to Lovell Manufacturing Company, Erie, Pa., a corporation of Pennsylvania Application July 19, 1934, Serial No. 736,008

5 Claims. (Cl. 68—253)

Wringers have heretofore been provided with devices for breaking the driving connection to the wringer and such devices have been so formed that the connection might be broken as a safety feature. Wringers have also been made with safety pressure release devices for relieving the pressure on the wringers and some wringers have been made in which the driving connection is broken as the safety release is operated. The present invention is designed to simplify and render more positive the mechanism for breaking the connection of the driving mechanism for safety purposes and preferably upon the operation of a safety release. Features and details of the invention will appear from the specification and claims.

A preferred embodiment of the invention is illustrated in the accompanying drawing as follows:—

Fig. 1 shows a central section through a wringer with the invention in place therein.

Fig. 2 an enlarged section of the driving connection.

Fig. 3 an end view of the driving connection fitting.

Fig. 4 an end view of the connecting sleeve.

Fig. 5 a section on the line 5—5 in Fig. 1.

Fig. 6 a section on the line 6—6 in Fig. 1.

1 marks the base of the wringer, 2 one stile, 3 the stile at the power side of the wringer, 4 the top, 5 the lower roll, 6 the upper roll, 7 a lower bearing for the lower roll at the end away from the driving mechanism, and 8 an upper sliding bearing for the upper roll, the lower roll being provided with the usual shaft 5a. A drive shaft 9 forms a driving means having the usual gear box 10. It is provided with a cross pin 11 which engages a slot 12 in the end of a connecting cam and connecting sleeve 13. The connecting sleeve has slots 14, each slot having cam sides adapted to engage a cross pin 15 in a shank 16 of a fitting 17. The fitting 17 has a slot 18 in its inner end adapted to engage a cross pin 19 on the shaft 5a. The fitting 17 has a socket 20 which receives the end of the shaft 5a. The fitting 17 operates in a bearing socket 22 in a bearing block 23 supported in any convenient manner in the frame.

A bearing block 24 is provided for the upper shaft at the power end of the wringer and a spring 25 rests on the blocks 8 and 24. A pressure pin 26 is connected with the spring and extends into a release sleeve 27. The release sleeve operates in an opening 28 in a releasing fitting 28a which is attached to the top 4. The release fitting has radial slots 29 and the release sleeve 27 has shoulders 30 which are adapted to pass through the slots 29. The shoulders operate on a cam surface 31 at the bottom of the fitting 28 resting on a slight flat in the neutral position so that when the shoulders are turned slightly they swing by reason of the cams to the slots 29 and permit the sleeve 27 to move outwardly, releasing pressure on the spring. A handle 32 is mounted on the sleeve 27 and facilitates the releasing movement.

A latch 33 is arranged at the power end of the wringer and pivotally mounted in the top by means of a pin 34. It has a cross bar 33a and a latch shoulder 35 engaging a notch 36 in the side stile. The opposite end of the wringer has a somewhat similar latch 37 which is pivotally mounted on a pin 38. A tail on the latch engages the top bar and limits its swinging movement. Upon the release of the release device the upthrow of the spring first releases pressure and the overrun of the spring operating on the cross bar 33a operates the latch and releases the power end of the wringer. The upswinging of the top also releases the latch 37 so that the pressure is entirely removed from the upper roll and the pressure thrust communicated from it to the lower roll is also relieved.

When pressure is placed on the lower roll, this pressure is communicated by the shaft 5a and fitting 17 to the bearing surfaces on the block 23 and this creates sufficient friction to interpose a retarding torque thrust on the connection to effect a camming action between the pin 15 and the sides of the slots 14, in response to such torque thrust resistance, to overcome the spring 21 and move the fitting 17 to the left, as shown in Fig. 2 into locking position with the sides of the slots 18 engaging the pin 19, as shown in Fig. 1. The wringer is then driven under all normal conditions, the added pressure on the rolls only serving to more surely maintain the driving relation. When the pressure is released on the rolls the spring 21 moves the fitting to the right. This is assisted slightly by a slight camming action of the sides of the slot 18 and the spring is sufficient with the slight friction between the fitting and the block 23 to hold the fitting in its released, or rear position, so that the driving of the roll immediately ceases.

What I claim as new is:—

1. In a wringer, the combination of a frame; rolls mounted in the frame; releasable pressure means exerting pressure on the rolls; driving means; and a driving connection between the driving means and a roll comprising devices responsive to torque resistance through the connection under normal roll pressure setting the driving connection for driving action and releasing the connection from driving action upon a release of such pressure.

2. In a wringer, the combination of a frame; rolls mounted in the frame; releasable pressure means exerting pressure on the rolls; driving means; and a driving connection having cam surfaces subjected to the torque thrust of the connection tending to set the connection in driving engagement under torque thrust through the connection and resilient means tending to break the engagement, the cams and resilient means being related to set the connection under normal roll pressure and break the connection on a release of roll pressure.

3. In a wringer, the combination of a frame; rolls mounted in the frame; a releasable pressure device for the rolls; a shaft for the lower roll; a fitting slidingly mounted on the shaft and having clutch surfaces moved into and out of engagement by axial movement of the fitting; a bearing in which the fitting is journaled; and driving means; and a driving connection between the driving means and the fitting comprising cam surfaces subjected to the torque thrust of the connection adapted to set the fitting in engagement under torque resistance through the connection incident to pressure on the roll shaft.

4. A roll wringer mechanism including a frame, a pair of rolls therein adapted to be pressed together; bearings for said rolls; a clutch mechanism having a driven element; devices cooperative between the driven element and a roll capable of establishing driving connection between said element and roll; and devices connecting said first-named devices with one of said bearings operable responsively to frictional resistance in the bearing to operate the clutch mechanism to cause rotation of said roll.

5. A roll wringer mechanism including a frame, a pair of rolls therein; means for pressing the rolls together whereby friction is set up tending to retard rotation of elements of the wringer; mechanism including a driven rotating element and a clutch mechanism capable of establishing driving connection between the driven element and the roll; and a follower element rotatable in unison with the driven element but adapted to have its rotation retarded responsively to pressure between the rolls, said element having operative connection with said clutch mechanism whereby the clutch is operated to establish said driving connection when rotation of the follower element is retarded.

WALTER L. KAUFFMAN II.